(12) United States Patent
Sy et al.

(10) Patent No.: US 8,218,522 B2
(45) Date of Patent: Jul. 10, 2012

(54) COMMUNICATION SCHEDULING OF NETWORK NODES USING A CLUSTER COEFFICIENT

(75) Inventors: Denh T. Sy, Rosemead, CA (US); Sung I. Park, Irvine, CA (US)

(73) Assignee: Raytheon Company, Waltham, MA (US)

(*) Notice: Subject to any disclaimer, the term of this patent is extended or adjusted under 35 U.S.C. 154(b) by 842 days.

(21) Appl. No.: 12/356,778

(22) Filed: Jan. 21, 2009

(65) Prior Publication Data
US 2010/0182978 A1 Jul. 22, 2010

(51) Int. Cl.
*H04J 3/00* (2006.01)

(52) U.S. Cl. ........ 370/345; 370/350; 370/322; 370/324; 370/238

(58) Field of Classification Search .......... 370/310–350, 370/254, 255, 235, 238
See application file for complete search history.

(56) References Cited

U.S. PATENT DOCUMENTS

| | | | |
|---|---|---|---|
| 6,901,064 B2 | 5/2005 | Cain et al. | |
| 7,062,687 B1 | 6/2006 | Gfeller | |
| 7,082,111 B2 | 7/2006 | Amouris | |
| 7,177,295 B1 | 2/2007 | Sholander et al. | |
| 7,397,810 B1* | 7/2008 | Young et al. | 370/431 |
| 7,502,360 B2 | 3/2009 | Liu et al. | |
| 7,610,059 B2 | 10/2009 | Roy et al. | |
| 7,616,565 B2 | 11/2009 | Park et al. | |
| 7,756,102 B2 | 7/2010 | Aceves | |
| 2002/0012337 A1 | 1/2002 | Schmidl et al. | |
| 2003/0067892 A1 | 4/2003 | Beyer et al. | |
| 2003/0206561 A1 | 11/2003 | Schmidl et al. | |
| 2003/0231588 A1 | 12/2003 | Roth et al. | |
| 2006/0268879 A1 | 11/2006 | Xhafa et al. | |
| 2007/0019594 A1 | 1/2007 | Perumal et al. | |
| 2007/0104177 A1 | 5/2007 | Hwang et al. | |
| 2007/0195817 A1 | 8/2007 | Denney et al. | |
| 2008/0043747 A1* | 2/2008 | Zheng | 370/395.41 |
| 2008/0089398 A1 | 4/2008 | Cormier et al. | |
| 2008/0198815 A1 | 8/2008 | Liu | |
| 2008/0205431 A1 | 8/2008 | Park et al. | |

(Continued)

FOREIGN PATENT DOCUMENTS

EP 1 178 625 A 2/2002

(Continued)

OTHER PUBLICATIONS

International Search Report (Form PCT/ISA/210) and Written Opinion of the International Searching Authority (Form PCT/ISA/237), for PCT/US2008/051276, Aug. 18, 2008, 9 pages.

(Continued)

*Primary Examiner* — Steven H Nguyen
*Assistant Examiner* — Kenan Cehic
(74) *Attorney, Agent, or Firm* — Daly, Crowley, Mofford & Durkee, LLP

(57) ABSTRACT

In one aspect, a method includes scheduling network communications in a network comprising nodes connected by links, receiving at a first node updated bandwidth values from the other nodes, determining a cluster coefficient based on a number of one-hop neighbors of the first node and a number of neighbors N-hops and less of the first node, adjusting the cluster coefficient to form an adjusted cluster coefficient and determining a wait period based on the adjusted cluster coefficient. The method also includes implementing the updated bandwidth values received to determine updated node weight values of the other nodes after the wait period has expired.

33 Claims, 6 Drawing Sheets

U.S. PATENT DOCUMENTS

| | | | |
|---|---|---|---|
| 2009/0052406 | A1 | 2/2009 | Park et al. |
| 2009/0054073 | A1 | 2/2009 | Roy et al. |
| 2009/0086752 | A1 | 4/2009 | Anderson et al. |
| 2010/0040079 | A1 | 2/2010 | Park et al. |
| 2011/0205925 | A1* | 8/2011 | Anderson et al. ............ 370/252 |
| 2012/0057522 | A1* | 3/2012 | Van Wyk et al. ............ 370/315 |

FOREIGN PATENT DOCUMENTS

| | | |
|---|---|---|
| EP | 1371183 A1 | 12/2003 |
| JP | 2003 046595 A | 2/2003 |
| KR | 2002 0055285 | 7/2002 |
| WO | WO 0048367 A2 | 8/2000 |
| WO | WO 0048367 A3 | 8/2000 |
| WO | WO 0128170 A2 | 4/2001 |
| WO | WO 0128170 A3 | 4/2001 |
| WO | WO 01/28170 A | 1/2002 |
| WO | WO 03/090083 A1 | 10/2003 |
| WO | WO 2008/016495 A2 | 2/2008 |
| WO | WO 2009/046143 A2 | 4/2009 |

OTHER PUBLICATIONS

Notification of Transmittal of the International Search Report and the Written Opinion of the International Searching Authority, or the Declaration dated Dec. 4, 2008, PCT/US2008/071407.

Lichun Bao, et. al. "Channel Access Scheduling in Ad Hoc Networks with Unidirectional Links", Computer Science Dept. and Computer Engineering Dept., University of CA, Santa Cruz, CA, 2001, 10 pages.

Lichun Bao, et. al., "Hybrid Channel Access Scheduling in Ad Hoc Networks", Computer Science Dept. and Computer Engineering Dept., University of CA, 2002.

Lichun Bao: "MALS: multiple access scheduling based on Latin squares" Military Communications Conference, 2004. MILCOM 2004. 2004 IEEE Monterey, CA, USA Oct. 31,-Nov. 3, 2004, Piscataway, NJ, USA, IEEE vol. 1, Oct. 31, 2004, pp. 315-321, XP010827102 ISBN: 987-0/7803-8847-5 whole document, in particular p. 320, left column, $2^{nd}$ and $3^{rd}$ paragraph.

Lichun Bao et al: "Hybrid channel access scheduling in ad hoc networks" Network Protocols, 2002. Proceedings. $10^{TH}$ IEEE International Conference on Nov. 12-15, 2002 Piscataway, NJ, USA, IEEE, Nov. 12, 2002, pp. 46-57, XP010632566 ISBN: 978-0/7695-1856-5, abstract, chapter 3.1.

Sung Park, et al., "Communication Scheduling of Network Nodes", U.S. Appl. No. 11/842,998, filed Aug. 22, 2007.

U.S. Appl. No. 11/678,668, Sung Park, et al., filed Feb. 26, 2007 file through Jan. 20, 2009, 453 pages.

U.S. Appl. No. 11/842,998, Sung Park, et al., filed Aug. 22, 2007, file through Jan. 20, 2009, 569 pages.

U.S. Appl. No. 11/947,928, Arthur Anderson, et al., filed Nov. 30, 2007, file through Jan. 20, 2009, 379 pages.

Arthur Anderson, et al., "Method for Increasing the Successful Outcomes of a Fair Coin Flip Using a Node Weight Metric in a Communication System", U.S. Appl. No. 60/976,730, filed Oct. 1, 2007, 5 pages.

Arthur Anderson, et al., "Communication Scheduling of Network Notes Using Fair Access and Weighting Technigues", U.S. Appl. No. 11/947,928, filed Nov. 30, 2007, 31 pages.

File downloaded from U.S. Appl. No. 11/548,763, filed Oct. 12, 2006, 35 pages.

File downloaded from U.S. Appl. No. 11/678,668, filed Feb. 26, 2007, 35 pages.

File downloaded from U.S. Appl. No. 11/842,998, filed Aug. 22, 2007, 49 pages.

Notification of Transmittal of the International Search Report and the Written Opinion of the International Searching Authority, or the Declaration, PCT/US2008/077331 dated Jan. 28, 2009.

Notice of Allowance dated Jan. 24, 2012 from U.S. Appl. No. 12/508,747.

Notification of Transmittal of the International Search Report and the Written Opinion of the International Searching Authority, or the Declaration, PCT/US2009/067459 date of mailing Feb. 17, 2010, 7 pages.

Written Opinion of the International Searching Authority, PCT/US2009/067459 date of mailing Feb. 17, 2010, 7 pages.

Sung Park et al.: "Dynamic control slot scheduling algorithms for TDMA based Mobile Ad Hoc Networks", Military Communications Conference, 2008. Milcom 2008. IEEE, Piscataway, NJ. Nov. 16, 2008, 7 pages. XP031408374. ISBN: 978-1-4244-2676-8.

International Preliminary Report on Patentability (Form PCT/IB/326) and Written Opinion of the International Search Authority (Form PCT/ISA/237) for PCT/US2008/071407, dated Mar. 4, 2010, 12 pages.

Notification Concerning Transmittal of International Preliminary Report on Patentability (Chapter 1 of the Patent Cooperation Treaty), PCT/US2009/052366, date of mailing Feb. 24, 2011, 1 page.

Written Opinion of the International Searching Authority, PCT/US2009/052366, date of mailing Feb. 24, 2011, 9 pages.

O. Tickoo, V. Subramanian, S. Kalyanaraman, and K. K. Ramakrishnan, "LT-TCP: End-to-end Framework to Improve TCP Performance Over Networks with Lossy Channels." Quality of Service—IWQoS 2005, Lecture Notes in Computer Science, 2005, vol. 3552/2005, pp. 81-93.

H. Balakrishnan, S. Seshan, and, R. Katz, "Improving reliable transport and handoff performance in cellular wireless networks." ACM Wireless Networks Journal, Dec. 1995.

T. Ho, M. Medard, R. Koetter, D.R. Karger, M. Effros, J. Shi, and B. Leong, "A Random Linear Network Coding Approach to Multicast", IEEE Transaction on Information Theory. vol. 52, Issue 10, pp. 4413-4430, 2006.

File downloaded from U.S. Appl. No. 11/842,998, filed Aug. 22, 2007, through Mar. 15, 2011, 62 pages.

File downloaded from U.S. Appl. No. 12/508,747, filed Jul. 24, 2009, through Mar. 15, 2011, 8 pages.

File downloaded from U.S. Appl. No. 12/425,753, filed Apr. 17, 2009, through Mar. 15, 2011, 10 pages.

Notification of Transmittal of the International Search Report and the Written Opinion of the International Searching Authority, or the Declaration, PCT/US2010/021719 dated Apr. 23, 2010, 5 pages.

Written Opinion of the International Searching Authority, PCT/US2010/021719 dated Apr. 23, 2010, 9 pages.

Haas Z J et al.: "Evaluation of the Ad-Hoc Connectivity with the Zone Routing Protocols", Proceedings of Annual Virginia Tech Symposium on Wireless Personal Communications, Jun. 10, 1998, pp. 201-212, XP008001971.

Chakeres Group Cengen C Perkins Wichorus I: "Dynamic MANET On-demand (DYMO) Routing; draft-ietf-manet-dymo-17.txt", Dynamic MANET On-Demand (DYMO) Routing; Draft-IETF-MANET-DYMO-17.TXT, Internet Engineering Task Force, IETF; Standardworkingdraft, Internet Society (ISOC) 4, Rue Des Falaises Ch- 1205, Geneva, Switzerland, vol. manet, No. 17, Mar. 8, 2009, XP015061015.

Bao L et al.: "A New Approach to Channel Access Scheduling for Ad Hoc Networks", Proceedings of the $7^{th}$ Annual International Conference on Mobile Computing and Networking, MOBICOM 2001. Rome, Italy, Jul. 16-21, 2001 [Annual International Conference on Mobile Computing and Networking], New.York, NY: ACM, US LNKD- D01:10.1145/, vol. CONF. 7, Jul. 16, 2001, pp. 210-220, XP001072006, ISBN: 978-1-58113-422-3.

File downloaded from U.S. Appl. No. 11/678,668, filed Feb. 26, 2007, file from Jan. 25, 2010 (last download) through May 7, 2010, 1 page.

File downloaded from U.S. Appl. No. 11/842,998, filed Aug. 22, 2007, file from Jan. 25, 2010 (last download) through May 7, 2010, 144 pages.

File downloaded from U.S. Appl. No. 12/508,747, filed Jul. 24, 2009, through May 7, 2010, (Section 1) 442 pages.

File downloaded from U.S. Appl. No. 12/508,747, filed Jul. 24, 2009, through May 7, 2010, (Section 2) 321 pages.

File downloaded from U.S. Appl. No. 12/508,747, filed Jul. 24, 2009, through May 7, 2010, (Section 3) 433 pages.

File downloaded from U.S. Appl. No. 12/425,753, filed Apr. 17, 2009, through May 11, 2010, (Section 1) 313 pages.

File downloaded from U.S. Appl. No. 12/425,753, filed Apr. 17, 2009, through May 11, 2010, (Section 2) 314 pages.

File downloaded from U.S. Appl. No. 12/425,753, filed Apr. 17, 2009, through May 11, 2010, (Section 3) 314 pages.
File downloaded from U.S. Appl. No. 12/425,753, filed Apr. 17, 2009, through May 11, 2010, (Section 4) 310 pages.
International Search Report PCT/US2008078501 dated Apr. 28, 2009, 1 page.
Vaidya et al, "Distributed Fair Scheduling in a Wireless LAn", IEEE Trans. On Mobile Computing, vol. 4, No. 6, (Nov. 2005), pp. 616-629.
Shiann-Tsong et al., "A Bandwidth Allocation/Sharing/Extension Protocol for Multimedia Over IEEE 802.11 *Ad Hoc* Wireless LANs", IEEE Journal on Selected Areas in Communication, vol. 19, No. 10, (Oct. 2001), pp. 2065-2080.
Qi et al, "Ad hoc QoS on-demand routing (AQOR) in mobile ad hoc networks," Journal of Parallel and Distributed Computing 63, (2003), pp. 154-165.
Sung I. Park et al., "Multicasting in a Network Using Neighbor Information", U.S. Appl. No. 61/089,135, filed Aug. 15, 2008 50 pages.
Sung I. Park et al., "Multicasting in a Network Using Neighbor Information", U.S. Appl. No. 12/508,747, filed Jul. 24, 2009 43 pages.
Notification Concerning Transmittal of International Preliminary Report on Patentability (Chapter 1 of the Patent Cooperation Treaty), PCT/US2009/067459, date of mailing Aug. 4, 2011, 2 pages.
Written Opinion of the International Searching Authority, PCT/US2009/067459, date of mailing Aug. 4, 2011, 5 pages.
File downloaded from U.S. Appl. No. 11/842,998, filed Aug. 22, 2007, from May 7, 2010 through Oct. 1, 2010, 124 pages.
File downloaded from U.S. Appl. No. 12/425,753, filed Apr. 17, 2009, from May 11, 2010 through Oct. 1, 2010, 86 pages.
File downloaded from U.S. Appl. No. 12/508,747, filed Jul. 24, 2009, from May 11, 2010 through Oct. 1, 2010, 86 pages.
Notification of Transmittal of the International Search Report and the Written Opinion of the International Searching Authority, or the Declaration, PCT/US2007/021640 dated Jun. 20, 2008, 6 pages.
Written Opinion of the International Searching Authority, PCT/US2007/021640 dated Jun. 20, 2008, 10 pages.
Notification of Transmittal of the International Search Report and the Written Opinion of the International Searching Authority, or the Declaration, PCT/US2009/052366, dated Dec. 3, 2009, 6 pages.
Written Opinion of the International Searching Authority, PCT/US2009/052366, dated Dec. 3, 2009, 11 pages.
Clausen et al., "Optimized Link State Routing Protocol (OLSR); rfc3626.txt" IETF Standard, Internet Engineering Task Force, IETF, Ch, Oct. 1, 2003, XP015009408, ISSN: 0000-0003, 75 pages.
Qayyum et al., "Multipoint relaying for flooding broadcast messages in mobile wireless networks", System Sciences, 2001. HICSS. Proceedings of the 35th Annual Hawaii International Conference on Jan. 7-1, 2001, Piscataway, NJ, USA, IEEE, Los Alamitos, CA, USA, Jan. 7, 2001, pp. 3898-3907, XP010587721, ISBN: 978-0/7695-1435-2, 10 pages.
Lim et al., "Flooding in wireless ad hoc networks", Computer Communications, Elservier Science Publishers BV, Amsterdam, NL, vol. 24, No. 3-4, Feb. 15, 2001, pp. 353-363, XP004248987, ISSN: 0140-3664, 11 pages.
Peng et al., "AHBP: an efficient broadcast protocol for mobile ad hoc networks", Journal of Computer Science and Technology, Science Press, Beijing, CN, vol. 16, No. 2, Mar. 1, 2001, pp. 114-125, XP008099976, ISSN: 1000-9000, 12 pages.
Bao et al., "A New Approach to Channel Access Scheduling for Ad Hoc Networks" Proceedings of the 7th Annual International Conference on Mobile Computing and Networking. Mobicom 2001. Rome, Italy, Jul. 16-21, 2001; [Annual International Conference on Mobile Computing and Networking], New York, NY: ACM, US, vol. Conf. 7, Jul. 16, 2001, pp. 210-220, XP001072006, ISBN: 978-1-58113422-3, 11 pages.
Notification Concerning Transmittal of International Preliminary Report on Patentability (Chapter I of the Patent Cooperation Treaty) PCT/US2008/051276 dated Sep. 3, 2009, 2 pages.
Written Opinion of the International Searching Authority PCT/US2008/051276 dated Sep. 3, 2009, 5 pages.
File downloaded: Sung Park et al., "Network Communication Scheduling", U.S. Appl. No. 11/678,668, filed Feb. 26, 2007, through Dec. 14, 2009, 901 pages.
File downloaded: Sung Park et al., "Communication Scheduling of Network Nodes", U.S. Appl. No. 11/842,998, filed Aug. 22, 2007, through Dec. 14, 2009, 910 pages.
File downloaded: Sung I. Park et al., "Cross Layer Routing (XRP) Protocol", U.S. Appl. No. 12/425,753, filed Apr. 17, 2009, through Dec. 14, 2009, 549 pages.
File downloaded: Sung I. Park et al., "Multicasting in a Network Using Neighbor Information", U.S. Appl. No. 12/508,747, filed Jul. 24, 2009, 923 pages, through Dec. 22, 2009.
Application: Sung I. Park et al., "Cross Layer Routing (XRP) Protocol", U.S. Appl. No. 12/425,753, filed Apr. 17, 2009, 60 pages.
File downloaded: Arthur Anderson et al., "Communication Scheduling of Network Nodes Using Fair Access and Weighting Techniques", U.S. Appl. No. 11/947,928, filed Nov. 30, 2007, Jan. 20, 2009 through Dec. 28, 2009, 350 pages.
File downloaded: Daniel R. Cormier et al., "Determining a Mode to Transmit Data", U.S. Appl. No. 11/548,763, filed Oct. 12, 2006, through Dec. 16, 2009, 373 pages.

* cited by examiner

|  | Timeslot 1 | Timeslot 2 | Timeslot 3 | Timeslot 4 |
|---|---|---|---|---|
| Node 12a | Receive | Receive | Receive | Transmit |
| Node 12b | Transmit | Receive | Receive | Receive |
| Node 12c | Receive | Receive | Transmit | Receive |
| Node 12d | Receive | Transmit | Receive | Receive |

```
    Total_current = current summation of 3 queue types
        Total_prev   = previous sec. summation of 3 queue types
        Last_Max_Q_Size = the max queue size for this neighbor recorded
in the previous second
        DECREMENT_THRESH = 5 packets If (Total_current == Total_prev)
    {
       if (Total_current != 0)
       {
           Increase BW_out by 3;
           (Max BW value cannot be greater than 7)
       }
       else
       {
          if (Last_Max_Q_Size < 30 packets)
               Decrease BW_out by 1;
    (Min BW value cannot be less than 1)
       }
    }
    else if (Total_current > Total_previous)
    {
       Increase BW_out by 3;
       (Max BW value cannot be greater than 7)
    }
    else if (Total_current < Total_previous)
    {
           if ((Total_current - Total_prev) > DECREMENT_THRESH)
       {
       if (Last_Max_Q_Size < 30 packets)
              Decrease BW_out by 1;
    (Min BW value cannot be less than 1)
    }
    else
    {
       BW_out stays the same.
    }

|  | Timeslot 1 | Timeslot 2 | Timeslot 3 | Timeslot 4 |
|---|---|---|---|---|
| Node 12a | Receive | Receive | Receive | Transmit |
| Node 12b | Receive | Receive | Receive | Receive |
| Node 12c | Receive | Receive | Transmit | Receive |
| Node 12d | Transmit | Transmit | Receive | Receive |

COMMUNICATION SCHEDULING OF NETWORK NODES USING A CLUSTER COEFFICIENT

BACKGROUND

In a shared network with multiple users sharing the same frequency, it is desirable to have only one user transmit data at a time. For example, if one user transmits data at the same time another user is transmitting data, collisions occur and data is generally corrupted and lost. One method to reduce collisions in the shared networks is to use time division multiple access (TDMA). TDMA enables several users to share the same frequency by dividing the use of the shared frequency into different timeslots, one user per timeslot. For example, the users transmit data in succession (i.e., one user transmits data after another user transmits data), each user using its own timeslot so that only one user transmits data during a timeslot.

SUMMARY

In one aspect, a method includes scheduling network communications in a network comprising nodes connected by links, receiving at a first node updated bandwidth values from the other nodes, determining a cluster coefficient based on a number of one-hop neighbors of the first node and a number of neighbors N-hops and less of the first node, adjusting the cluster coefficient to form an adjusted cluster coefficient and determining a wait period based on the adjusted cluster coefficient. The method also includes implementing the updated bandwidth values received to determine updated node weight values of the other nodes after the wait period has expired.

In another aspect, a network node schedules communications in a network having nodes connected by links including at least one wireless link. The network node includes circuitry to receive at the network node updated bandwidth values of other nodes in the network, determine a cluster coefficient based on a number of one-hop neighbors and a number of two-hop neighbors of the node, adjust the cluster coefficient to form an adjusted cluster coefficient and determine a counter value based on the adjusted cluster coefficient. The network node also includes circuitry to implement the updated bandwidth values received to determine updated node weight values of the other nodes after a counter achieves one of a predetermined value from a starting point corresponding to the counter value or the counter value from a starting point corresponding to the predetermined value.

In a further aspect, an article includes a machine-readable medium that stores executable instructions to schedule communications in a network having nodes connected by links comprising at least one wireless link. The instructions cause a machine to receive updated bandwidth values of other nodes, determine a cluster coefficient based on a number of one-hop neighbors and a number of two-hop neighbors, adjust the cluster coefficient to form an adjusted cluster coefficient, determine a counter value based on the adjusted cluster coefficient and implement the updated bandwidth values received to determine updated node weight values of the other nodes after a counter achieves one of a predetermined value from a starting point corresponding to the counter value or the counter value from a starting point corresponding to the predetermined value.

DESCRIPTION OF THE DRAWINGS

FIG. 4 is an example of pseudocode used to determine a bandwidth value.

DETAILED DESCRIPTION

Described herein is an approach to schedule network communications using a fair access technique combined with a weighting technique based on channel bandwidth. The approach described herein allows a decision process of determining which node transmits to be made in a distributed environment without the need for a centralized protocol. The approach also provides access to transmit on a channel based on need rather than on earlier requests for channel access, for example. Moreover, the approach adapts to changing channel conditions. Also described herein is an approach to determine a wait period for implementing updated bandwidth values using a cluster coefficient.

While the fair access technique described herein uses a Node Activation Multiple Access (NAMA) technique, any fair access technique may be used, for example, a Resource Oriented Multiple Access (ROMA). Also, while the channels described herein are time slots within a TDMA, the techniques described herein are not limited to TDMA.

Figures 1, 2:
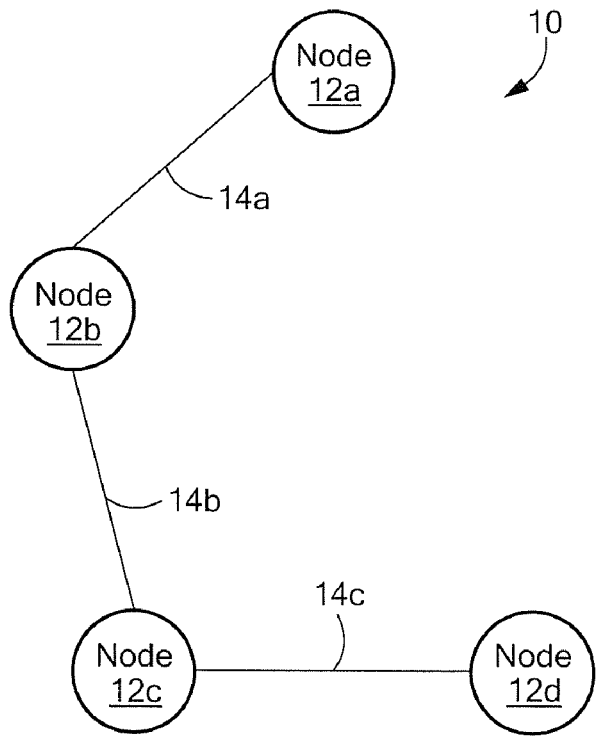
FIG. 1 is a diagram of a communication network including nodes.
FIG. 2 is a table of an example of a network schedule based on a fair access technique.

Referring to FIG. 1, a communications network 10 includes nodes (e.g., a first node 12a, a second node 12b, a third node 12c and a fourth node 12d). In one example, the nodes 12a-12d are network routers. In another example, the nodes 12a-12d are wireless radios. The nodes 12a-12d are connected by links representing that the two nodes are within transmit/receive range of each other (e.g., a first link 14a connecting the first node 12a to the second node 12b, a second link 14b connecting the second node 12b to the third node 12c and a third link 14c connecting the third node 12c to the fourth node 12d).

In one example, the links 14a-14c are wireless links. In another example, the links 14a-14c are wired links. In another example, links 14a-14c may be a combination of wireless and wired links. The communications network 10 may be any shared medium. The links 14a-14c may include one or more channels.

The first node 12a and the second node 12b are one hop away from each other (i.e., one-hop neighbors). One hop means that the shortest network path from the first node 12a to the second node 12b does not include any intervening nodes (i.e., one link). Likewise the second node 12b and the third node 12c and the third node 12c and the fourth node 12d are all one-hop neighbors to each other.

The first node 12a and the third node 12c are two hops away from each other (i.e., two-hop neighbors). Two hops means that the shortest network path from the first node 12a to the third node 12c includes only one intervening node (the second node 12b) (i.e., two links). Likewise the second node 12b and the fourth node 12d are two-hop neighbors to each other.

A goal of network communications scheduling is to ensure that only one network node communicates at a time. For example, in a wireless network, if one node transmits data at the same time another node is transmitting data, collisions, which corrupt the data, will occur at a receiving node which is in wireless range of both transmitting nodes. One way used in the prior art to reduce collisions is to use time division multiplexing access (TDMA). One particular implementation of TDMA uses a Node Activation Multiple Access (NAMA) technique. NAMA is a wireless multiple access protocol designed to generate dynamic and collision-free TDMA timeslot scheduling. NAMA achieves collision-free TDMA timeslot scheduling by having nodes within one and two hops of each other, for example, participate in a cooperative random election process. Each node performs the same random election process to determine simultaneously which node transmits data for a particular timeslot.

For example, referring back to FIG. 1, the nodes 12a-12d implement an election process for four timeslots (e.g., timeslot 1, timeslot 2, timeslot 3 and timeslot 4). During each timeslot, each node 12a-12d in the network 10 determines a set of pseudo-random numbers based on each node's ID for those nodes that are within one or two hops distance. The assumption is that each node is aware of all other nodes (e.g., has the node ID of the other nodes) within a two-hop neighborhood. Since each node is using the same pseudo random number generation function to determine the random numbers, each node will come up with a consistent random value for each of the nodes within the two-hop neighborhood. Once a set of values is determined, the node with the highest value in a particular timeslot transmits during that timeslot.

In one particular example of determining random values, in timeslot 1, the first node 12a is determined to have a value of 4, the second node 12b is determined to have a value of 8, the third node 12c is determined to have a value of 1 and the fourth node 12d is determined to have a value of 7. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4 and the fourth node 12d is determined to have a value of 9. Since the fourth node 12d has the highest value, the fourth node is the only node that transmits during timeslot 2.

In timeslot 3, the first node 12a is determined to have a value of 2, the second node 12b is determined to have a value of 1, the third node 12c is determined to have a value of 6 and the fourth node 12d is determined to have a value of 3. Since the third node 12c has the highest value, the third node is the only node that transmits during timeslot 3.

In timeslot 4, the first node 12a is determined to have a value of 8, the second node 12b is determined to have a value of 5, the third node 12c is determined to have a value of 2 and the fourth node 12d is determined to have a value of 7. Since the first node 12a has the highest value, the first node is the only node that transmits during timeslot 4.

FIG. 2 includes a table 20 indicating a transmit schedule for the nodes during the four timeslots in the preceding example. The resulting schedule from the election process achieves a collision-free schedule by allowing only one node to transmit (within one- or two-hop neighbors) during each timeslot.

It is therefore desirable in NAMA scheduling for each node to have a consistent view of the network in order to guarantee collision-free schedules. In a dynamic network, a consistency may be achieved by constantly exchanging control information among one-hop neighbors. The control information used in establishing consistency in NAMA scheduling includes at least the node ID of the originator and the node IDs of all the one-hop neighbors of the originator. Upon receiving control information, each node can build up a comprehensive list of neighbors using the node ID of the originator (which becomes one-hop neighbors of the receiver) and node IDs of the one-hop neighbors (which become two-hop neighbors of the receiver).

NAMA scheduling alone does not take in to account bandwidth requirements for each node. In the process described in FIG. 3, each node 12a-12d determines a bandwidth value for each link 14a-14c based on queue size. The bandwidth value is used to bias the fair access technique in favor of those nodes 12a-12d that currently have the most packets to send.

Figure 3:
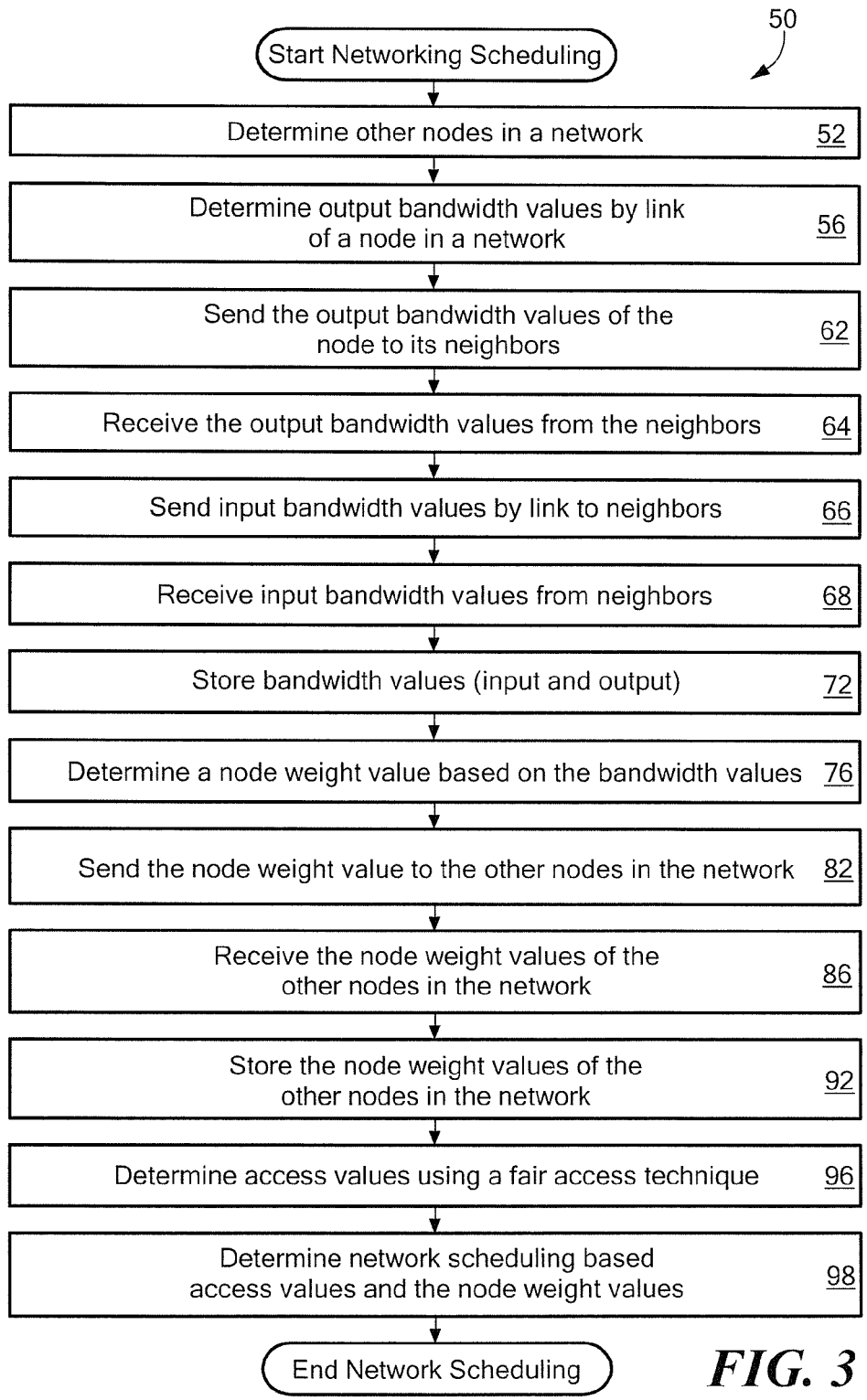
FIG. 3 is a flowchart of an example of a process to schedule network communications using fair access and weighting techniques.

FIG. 3 depicts a flowchart for a process 50 which is an example of a process for network scheduling that includes weighting results of a fair access technique such as NAMA with bandwidth need. Process 50 is performed by each node 12a-12d independently. The nodes 12a-12d determine other nodes in the network (52). For example, during the control timeslots, each node 12a-12d broadcasts its node ID to one-hop neighbors. In this particular example, the node 12a receives a node ID from the node 12b; the node 12b receives node IDS from the nodes 12a, 12c; the node 12c receives node IDs from the nodes 12b, 12d; and the node 12d receives a node ID from the node 12c.

Each node 12a-12d determines its output bandwidth value for each link 14a-14c (56). For example, the node 12a determines an output bandwidth value for link 14a; the node 12b determines output bandwidth values for each of the links 14a, 14b; the node 12c determines output bandwidth values for each of the links 14b, 14c and the node 12d determines an output bandwidth value for the link 14c.

In one example, an output bandwidth value is associated with the number of packets waiting in outbound queues of a node. The output bandwidth value is a number from 1 to 7, for example, representing a sliding scale associated with the number packets. For example, an output bandwidth value of 7 could represent 30 packets in the outbound queues while an output bandwidth value of 3 represents 15 packets in the outbound queues. In one particular example, the bandwidth is determined using pseudocode 100 shown in FIG. 4.

Each node 12a-12d sends its output bandwidth values to its neighbors (62). In one example, the neighbors are one-hop neighbors so that the node 12a sends its output bandwidth value for the link 14a to its one-hop neighbor, node 12b; the node 12b sends its output bandwidth values for the links 14a, 14b to its one-hop neighbors, nodes 12a, 12c respectively; the node 12c sends its output bandwidth values for the links 14b, 14c to its one-hop neighbors, nodes 12b, 12d respectively and the node 12d sends its output bandwidth value for the link 14c to its one-hop neighbor, node 12c.

In one particular example, the node 12a determines an output bandwidth value of 3 for link 14a; the node 12b determines output bandwidth values of 1 and 5 for each of the links 14a, 14b, respectively; the node 12c determines output bandwidth values of 5 and 2 for each of the links 14b, 14c respectively and the node 12d determines an output bandwidth value of 2 for the link 14c. Thus, node 12a sends the output bandwidth value of 3 to the node 12b during a control timeslot; node 12b sends the output bandwidth value of 1 to node 12a during a control timeslot and the output bandwidth value of 5 to the node 12c during a control timeslot; node 12c sends the output bandwidth value of 5 to node 12b during a control timeslot and the output bandwidth value of 2 to the node 12d during a control timeslot; and node 12d sends the output bandwidth value of 2 to the node 12c during a control timeslot. Each node 12a-12d receives output bandwidth values from its neighbors (e.g., one-hop neighbors) (64).

Each node 12a-12d sends input bandwidth values by link to its neighbors (66). An input bandwidth value for a link at a node is an output bandwidth value for the node at the opposite end of the connected link. For example, for the link 14a, if node 12a has an output bandwidth value of 3 then the node 12b has an input bandwidth value having the same value.

In one example, the neighbors are one-hop neighbors so that when executing processing block 66, a node will receive bandwidth values by link for two-hop neighbors from its one-hop neighbors. For example, node 12b shares the input bandwidth value received from node 12c for the link 14b with node 12a, node 12b shares the input bandwidth value received from node 12a for the link 14a with node 12c, node 12c shares the input bandwidth value received from node 12b for the link 14b with the node 12d and the node 12c shares the input bandwidth value received from the node 12d for the link 14c with node 12b.

In one particular example, using the output bandwidth values in the example described for the processing block 64, each of the nodes, during a control timeslot, send its input bandwidth values. For example, the node 12a sends to node 12b its input bandwidth value of 1 for the link 14a; the node 12b sends to both nodes 12a, 12c its input bandwidth value of 3 for the link 14a and its input bandwidth value of 5 for the link 14b; the node 12c sends to both nodes 12b, 12d its input bandwidth value of 5 for the link 14b and its input bandwidth value of 2 for the link 14c; and the node 12d sends to node 12c its input bandwidth value of 2 for link 14c.

Each node 12a-12d receives the input bandwidth values from its neighbors (68) and stores both the input and output bandwidth values (72).

Each node 12a-12d determines its node weight value based on the bandwidth values (76). In one example, the higher the node weight value, the more likely the node will be transmitting and the lower the node weight value, the more likely the node will be receiving.

In one example, each of the nodes 12a-12d, for all of the node's one-hop neighbors, sum their output bandwidth values for each link, Total BW Out, and sum their input bandwidth values for each link, Total BW IN. In one example, a node weight is equal to (Total BW Out)/(Total BW Out+Total BW In).

For example, using the bandwidth values in the preceding examples, the node 12a has a node weight value equal to:

(3)/(3+1)=0.75, the node 12b has node weight value equal to:

(1+5)/(1+5+3+5)=0.43, the node 12c has a node weight value equal to:

(5+2)/(5+2+5+2)=0.50, and the node 12a has a node weight value equal to:

(2)/(2+2)=0.50

In other examples, the node weight value may be determined by other means. For example, instead of just using the node weight value as determined in the preceding example, the node weight value may be further processed. In particular, the Total BW out/(Total BW in+total BW out) equals a raw node weight value, RawNodeWt. Using the RawNodeWt, a limited node weight value, LimNodeWt, is determined to limit the node weight value to be between a particular range. For example, LimNodeWt:

$= 0.25$ (if $RawNodeWt < .25$)

$= RawNodeWt$ $= 0.9$ (if $RawNodeWt > .9$)

The LimNodeWt may be further modified in order to fill a particular bit requirement in a control word for transmission to other nodes. In particular, a broadcast node weight value, BroadcastNodeWt, is determined for transmission to the one-hop neighbors of a node. For example, if a control word used in a control timeslot is one byte, eight bits or less may be used to carry the bandwidth value. In one particular example, for a six-bit requirement (i.e., $2^6=64$), the BroadcastNodeWt is equal to CEIL (64*LimNodeWt). A node weight value, NodeWt, used for determining the weighting is equal to BroadcastNodeWt/64.0. Thus, each node receiving the BroadcastNodeWt would divide by 64.0 in order to use the NodeWt for use in weighting.

Each node 12a-12d sends the node weight values to the other nodes in the network (82). In one example, the node weight values are sent to one-hop neighbors. Each of the nodes 12a-12d receives the node weight values of the other nodes (86) and stores the node weight values (92).

Each of the nodes 12a-12d determines access values using a fair access technique (96). For example, each of the nodes 12a-12d uses a NAMA technique to generate random numbers for nodes based on the node IDs.

Each of the nodes 12a-12d determines network scheduling based on the access values and the node weight values (98). For example, using NAMA, the random values generated are weighted by the node weight values.

In one particular example of weighting the random values used in the example for the NAMA technique in FIG. 2, in timeslot 1, the first node 12a is determined to have a value of (4*0.75)=3.00, the second node 12b is determined to have a value of (8*0.43)=3.44, the third node 12c is determined to have a value of (1*0.50)=0.50 and the fourth node 12d is determined to have a value of (7*0.50)=3.50. Since the fourth node 12d has the highest value, the fourth node is the only node that transmits during timeslot 1.

In timeslot 2, the first node 12a is determined to have a value of (3*0.75)=2.25, the second node 12b is determined to have a value of (5*0.43)=2.15, the third node 12c is determined to have a value of (4*0.50)=2.00 and the fourth node 12d is determined to have a value of (9*0.50)=4.50. Since the fourth node 12d has the highest value, the fourth node is the only node that transmits during timeslot 2.

In timeslot 3, the first node 12a is determined to have a value of (2*0.75)=1.50, the second node 12b is determined to have a value of (1*0.43)=0.43, the third node 12c is determined to have a value of (6*0.50)=3.00 and the fourth node 12d is determined to have a value of (3*0.50)=1.50. Since the third node 12c has the highest value, the third node is the only node that transmits during timeslot 3.

In timeslot 4, the first node 12a is determined to have a value of (8*0.75)=6.00, the second node 12b is determined to have a value of (5*0.43)=2.15, the third node 12c is determined to have a value of (2*0.50)=1.00 and the fourth node 12d is determined to have a value of (7*0.50)=3.50. Since the first node 12a has the highest value, the first node is the only node that transmits during timeslot 4.

Figures 5, 6:
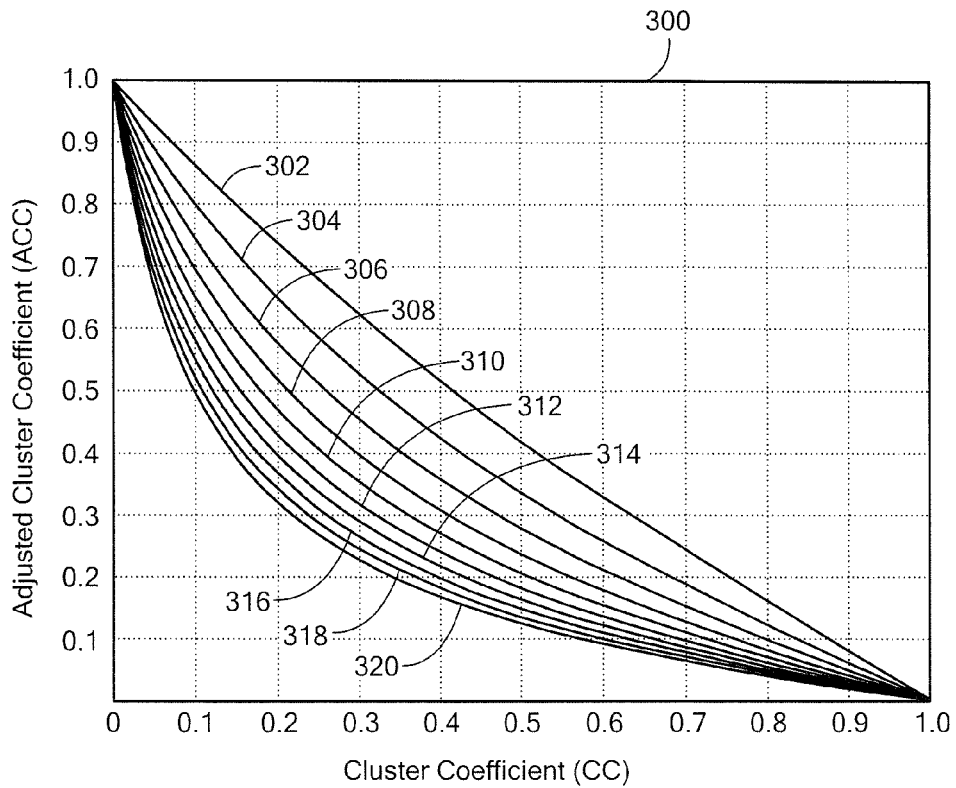
FIG. 5 is a table of an example of a network schedule using the process of FIG. 3.
FIG. 6 is a graph of examples of curves representing different steepness factors.

FIG. 5 includes a table 120 indicating a transmit schedule for the nodes during the four timeslots in the preceding example. The resulting schedule from the election process is weighted by bandwidth need for each timeslot. Rather than the node 12b transmitting in timeslot 1 as shown in FIG. 2, the node 12d transmits in the timeslot 1 because of the node weight value. Thus, the fair access is weighted to bandwidth need.

Since reception of control timeslots in any one-hop neighborhood is not guaranteed, those nodes 12a-12d that do not receive the control timeslots may be using a different set of bandwidth and node weight values compared to those nodes that did receive bandwidth values and node weight values in the control timeslots. Thus, with inconsistent data from which to base communications, collisions occur. One solution is to add a counter value associated with each bandwidth value in the control timeslot that is used by a counter to countdown to a predetermined value (e.g., zero). In this example, the counter value is used to ensure that enough time has elapsed for all pertinent nodes to receive the new bandwidth value. As used herein a countdown value is used for the counter value. For example, a countdown value is used by a counter (e.g., a countdown counter) that decrements from the counter value to the predetermined value or from the predetermined value to the counter value. In other examples, a counter value may be a count up value that is used by a counter (e.g., a count-up counter) that increments rather than decrements from the counter value to the predetermined value or from the predetermined value to the counter value.

In one example, if the control timeslot has a 1 byte-word and 6 bits are used for a node weight value, two bits may be used for a countdown value. As used herein, this countdown value is an original countdown value. In one example, the countdown value indicates a wait period, for example, before updated node weight values are used. There are a number of techniques that may be used to determine the original countdown value. In one example, a 'safe' large number is used for the original countdown value. In another example, the original countdown value is based on the number of neighbors (e.g., one- and two-hop neighbors) so that the more neighbors there are the higher the original countdown value.

In one particular example of determining an original countdown value, each node is synchronized using the Global Positioning System (GPS) so that each node is synchronized every 1 pulse per second (PPS), for example. Since the countdown values need to propagate to two-hop neighbors, the countdown values associated with each item is "2." Each node still computes a bandwidth value for each link; however when a node's link bandwidth value changes (up or down), that node, node X, for example, is not allowed to immediately use the new bandwidth value in network scheduling (e.g., processing block 98 of FIG. 3). Instead, node X sends (using control timeslots) to its one-hop neighbors the new bandwidth value and sets the countdown value to 2. The old bandwidth value is used in network scheduling by node X during the next second. After the next 1 PPS, Node X sends (using control timeslots) to all of its one-hop neighbors the new bandwidth value and sets the countdown value to 1. The old BW value is used by Node X in network scheduling during the next second. After the next 1 PPS, Node X sends (using control timeslots) to all of its one-hop neighbors the new bandwidth value and sets the countdown value to 0. The new bandwidth value is now used by Node X in network scheduling during the next second (e.g., using the process 50). Until the bandwidth value needs to be changed, all future control timeslots will have the new bandwidth value and will keep the countdown value at 0. In one example, an original countdown value of 0 indicates a given bandwidth value is being used. In one example, the original countdown value does not drop below zero and once a countdown has started, it continues to zero.

In other examples, a cluster coefficient may be used to adjust the original countdown value to account for a network topology. For example the original countdown value is adjusted to a lower value. In one example, instead of waiting for 2 seconds, as described in the previous paragraph, the time may be shortened based on the "connectedness" of the graph centered around a specific node to determine an adjusted countdown value. By reducing the original countdown value less time is wasted. However, the adjusted countdown value must still be sufficiently large so that updates have time to occur. One way to adjust the original countdown value is to use a cluster coefficient. The cluster coefficient (CC) is a metric describing the level of connection amongst all nodes in a graph. The cluster coefficient may be described in terms of an entire graph with values ranging from [0,1] inclusive where 0 is a completely disconnected graph and 1 is a fully connected graph. Simply stated, the CC of a graph is the number of connections that exist in a nodes' neighborhood divided by all possible connections that may occur, averaged over all nodes in the graph.

In one example, the CC may be used in weighted NAMA to describe the level of connection amongst an N-hop neighborhood. With the CC, connection data is used to determine a better countdown value with respect to the level of connection of a N-hop neighborhood, for example, a two-hop neighborhood (i.e., N=2). In particular, the CC determines a level of connectivity of a network centered on each node and reflects clustering around a node. For example, a two-hop neighborhood with a high CC does not require as much time to disseminate a countdown value to all the nodes in the two-hop neighborhood so that the original countdown value may be decreased. By using CC, the time between when a node needs to change its node weight value to when it can actually use its new weight value (i.e., using an updated bandwidth value to determine a new node weight value) may be shortened and bounded, with some certainty. This is accomplished by using CC to determine an adjusted countdown value.

The information available to a node is very limited so that certain simplifications to the original CC calculations are necessary. The scope of CC is adjusted from a graph-centric value to an N-hop neighborhood centered on a single node view. For purposes of transmission of the bandwidth values, an N-hop neighborhood of a single node is all that is required. In CC, each N-hop neighborhood is treated individually with the center node determining the CC value and the center node is a vertex so that:

CC=One-hop triangles/All triangles or:

$nCr(n_1, r)/nCr(n_2, r)$ where $n_1$ is equal to a number of one-hop neighbors, $n_2$ is equal to the number of neighbors N-hops and less (e.g., if N=2, a number of one-hop and two-hop neighbors) so that $n_2 \geq n_1$ and r is equal to 2. r=2 comes from the principle of forming triangles, such that there is one point being used (e.g., a vertex or center node which is fixed). By using the one point, only two other points are needed to form a triangle. The function, nCr(n, r), is the number of different, unordered combinations of r objects from a set of n objects or $nCr(n,r)=n!/((n-r)!r!)$.

CC values are between [0,1] where 0 describes a node with one or zero one-hop neighbors and 1 describes a node with all neighbors being one hop away. For example, referring to FIG. 1, for N=2, the cluster coefficient from the node 12c is equal to $(n_1!/((n_1-r)!r!))/(n_2!/((n_2-r)!r!))$ where $n_1$ is equal to "2" to account for the two one-hop neighbors, the node 12b and the node 12d; and where $n_2$ is equal to "3" to account for the two one-hop neighbors, the node 12b and the node 12d, and the one two-hop neighbor node 12a. CC is then equal to $(2!/((2-2)!2!))/(3!/((3-2)!2!))=1/3$ CC is further converted from its non-linear value into a usable fashion. For example, CC is non-linear because the addition of a single neighbor (e.g., one- or two-hop neighbor) will cause a non-linear change to CC. As such CC should be skewed so that a change from one small value to another is more pronounced than the same change from a large value to another. An adjusted CC, ACC, is determined to be:

$$ACC = \frac{1}{sf*CC+1} - \frac{CC}{sf+1}$$

where sf equals a steepness factor.

Referring to FIG. 6, a sf determines the degree of the slope, in the graph. Looking at FIG. 6 from right to left, the sf runs from 1 to 10. For example, a curve 302 has an sf of 1, a curve 304 has an sf of 2, a curve 306 has an sf of 3. a curve 308 has an sf of 4, a curve 310 has an sf of 5, a curve 312 has an sf of 6, a curve 314 has an sf of 7, a curve 316 has an sf of 8, a curve 318 has an sf of 9, a curve 320 has an sf of 10. The curve 302 may look like a straight line in FIG. 6 but it is slightly concave. An sf value of zero is the original CC without any adjustments. In this example, the steepness factors were determined to be whole numbered integers and there is no significance to their choices.

In one example, the choice of which sf to use (e.g., which curve 302-320 is used) may be made at the time of network deployment. The choice determines how aggressive a user chooses to be in using the clustering coefficient. For example, the higher the sf the more aggressive a user is in shortening the original countdown time. In one example, the function of each curve 302-320 is constructed so that the values between 0 and 1 along the X-axis are inversely proportional. In one example, a function associated with one of the curves 302-320 is deployed with each node. In one example, each node uses the same sf function.

The ACC is applied to the original countdown value so that an adjusted countdown value is equal to the original countdown values times ACC. In studies, the adjusted countdown value has been shown to be a much smaller number than the original countdown value, and very little change to a dissemination percentage has been observed as a result of shortening the original countdown value. The dissemination percentage is equal to the number of nodes that receive the new weight value divided by the number of nodes that must receive the new weight value. In NAMA (and in most any wireless MAC protocols, for example), the number of nodes that must receive the new weight value is both the one- and two-hop neighbors. Thus, dissemination times are able to be shortened while keeping most two-hop neighbors informed of the change.

Figure 7:
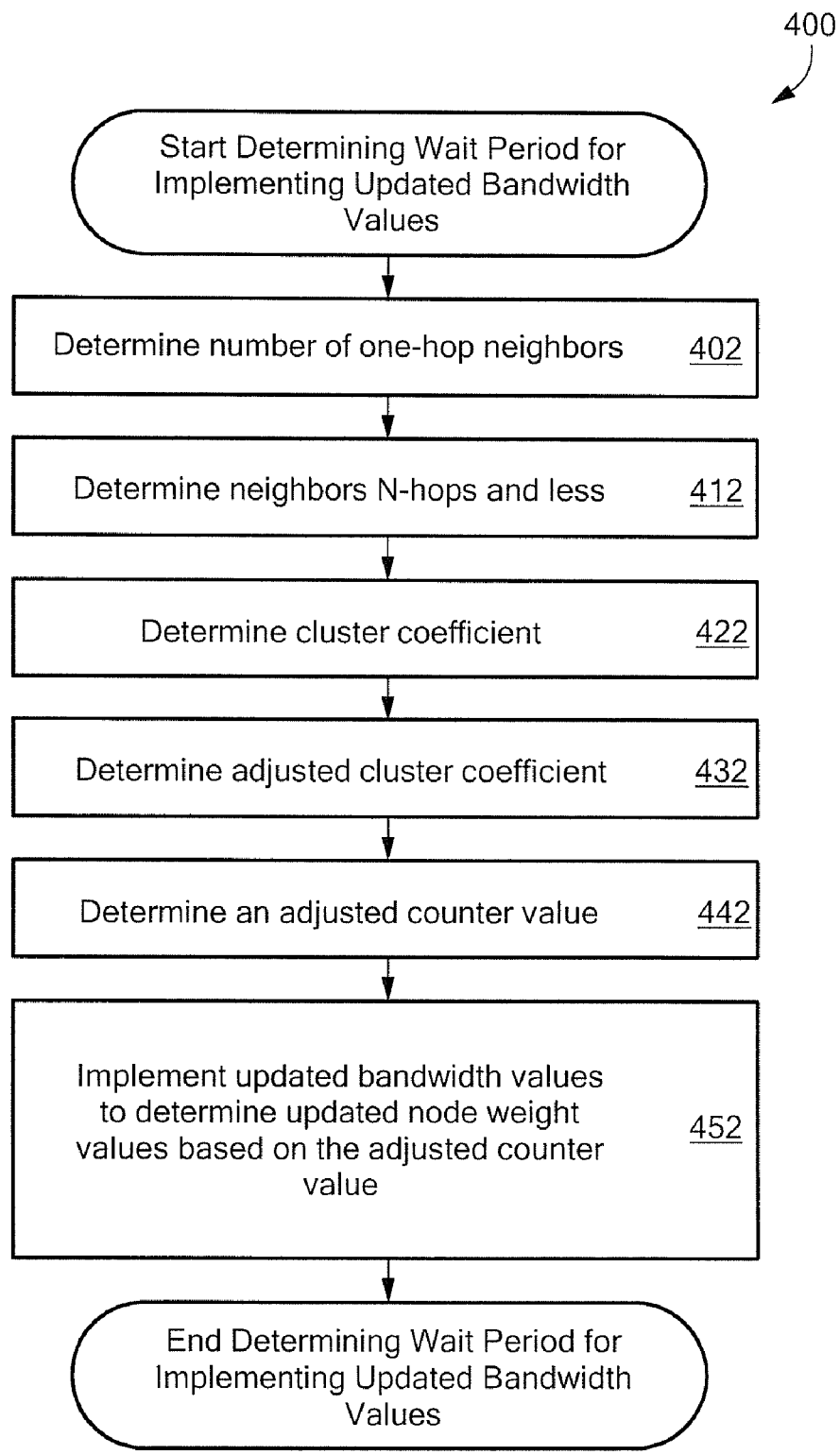
FIG. 7 is a flowchart of an example of a process to determine a wait period for implementing updated bandwidth values.

Referring to FIG. 7, one process to determine a wait period (e.g., an adjusted countdown value) for implementing new bandwidth values, for example, to determine and use updated node weight values is a process 400. The number of one-hop neighbors is determined (402). The number of neighbors that are N-hops and less are determined (412). For example, a number of two-hop neighbors and one-hope neighbors are determined for N=2. The number of one-hop neighbors and the number of neighbors N-hops and less are used to determine a cluster coefficient (422). For example, for N=2, the cluster coefficient, CC is equal to $(n_1!/((n_1-r)!r!))/(n_2!/((n_2-r)!r!))$, where $n_1$ are the number of one-hop neighbors and $n_2$ is equal to the number of two-hop neighbors and one-hop neighbors and r=2.

The adjusted cluster coefficient is determined from the cluster coefficient using a steepness factor (432). For example, the adjusted $$ACC = \frac{1}{sf*CC+1} - \frac{CC}{sf+1}.$$

The adjusted counter value is determined from the adjusted cluster coefficient (442). For example, the adjusted counter value is equal to ACC times the original counter value.

Updated bandwidth values are implemented to determine updated node weight values based on the adjusted counter value (452). For example, after a counter (e.g., a counter 530 (FIG. 8)) decrements from the adjusted counter value to zero, the updated node weight values are determined using the process 50, for example.

Figure 8:
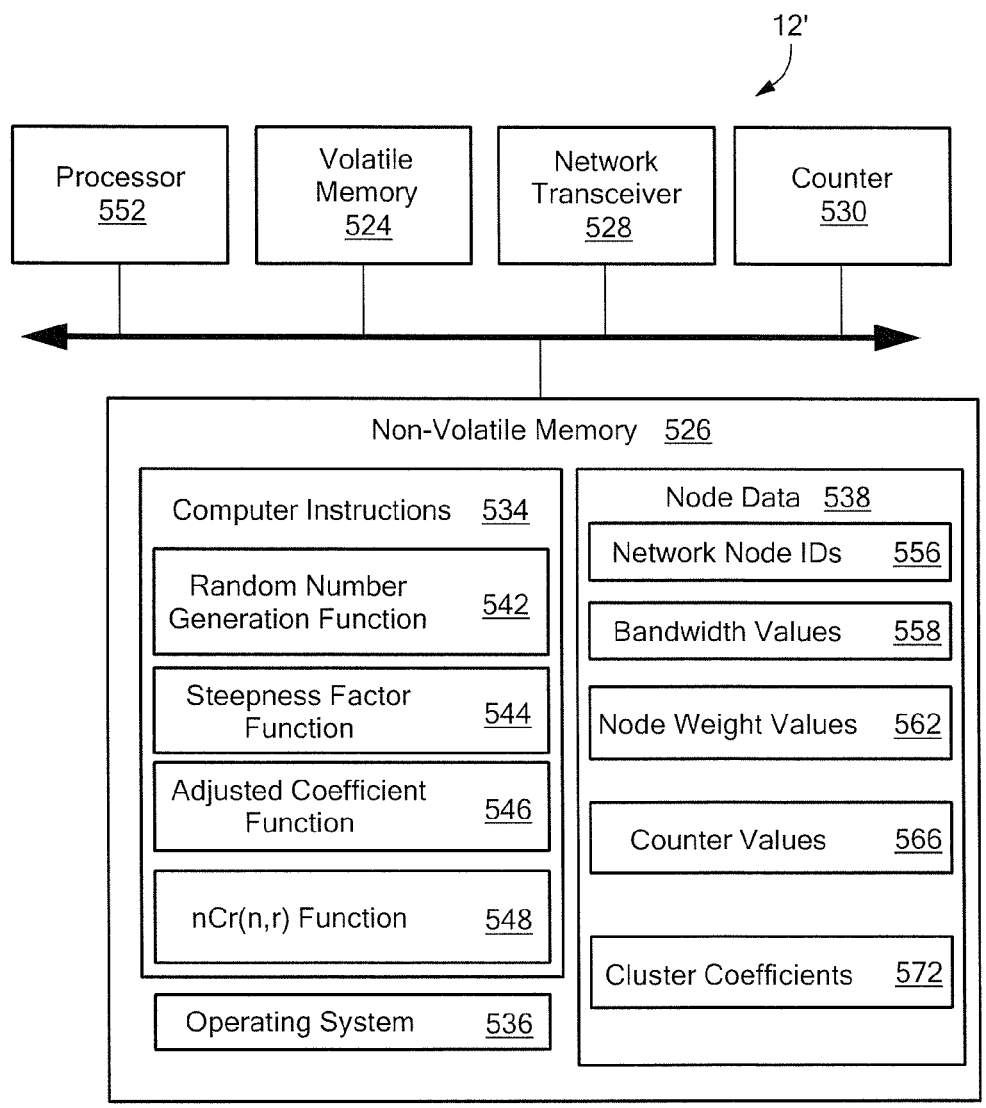
FIG. 8 is a block diagram of an example of a network node on which the processes of FIGS. 3 and 7 may be implemented.

Referring to FIG. 8, one or more of the nodes 12a-12d may be configured as a network node 12', for example. The network node 12' includes a processor 522, a volatile memory 524, a non-volatile memory 526 (e.g., hard disk), a network transceiver 528 and a counter 530. The non-volatile memory 526 stores computer instructions 534, an operating system 536 and node data 538. The computer instructions 534 include a random number generation function 542, for example, for use with NAMA to determine random number; a steepness factor function 544 to determine the steepness factor, sf, an adjusted coefficient function 546 to determine the adjusted coefficient and an nCr(n, r) function 548. The node data 538 includes network nodes IDs 556, bandwidth values 558, node weight values 562, a counter value 566 (e.g., a countdown value or a count-up value) including the original counter value and the adjusted counter value and cluster coefficients 572 including the cluster coefficient, CC, and the adjusted cluster coefficient, ACC. In one example, the node data 538 is stored in a list (not shown). In another example, the node data 538 is stored in tables (not shown). The network transceiver 528 is used to communicate with the other network nodes. The counter 530 may be a count-up counter or a countdown counter. In one example, the computer instructions 534 are executed by the processor 522 out of volatile memory 524 to perform process 50 and/or process 400.

The processes described herein (e.g., process 50 and process 400) are not limited to use with the hardware and software of FIG. 8; the processes may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The processes described herein are not limited to the specific embodiments described herein. For example, processes 50 and 400 are not limited to the specific processing order of FIGS. 3 and 7, respectively. Rather, any of the processing blocks of FIGS. 3 and 7 may be re-ordered, combined or removed, performed in parallel or in serial, as necessary, to achieve the results set forth above. In another example, the counter 530 may be replaced with a timer.

The processing blocks in FIGS. 3 and 7 associated with implementing the processes 50 and 400 respectively may be performed by one or more programmable processors executing one or more computer programs to perform the functions of the system. All or part of the processes 50 and 400 may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
scheduling network communications in a network comprising nodes connected by links;
receiving at a first node updated bandwidth values from the other nodes;
determining a cluster coefficient based on a number of one-hop neighbors of the first node, wherein N is greater than zero and a number of neighbors N-hops and less of the first node;
adjusting the cluster coefficient to form an adjusted cluster coefficient;
determining a wait period based on the adjusted cluster coefficient; and
implementing the updated bandwidth values received to determine updated node weight values of the other nodes after the wait period has expired.

2. The method of claim 1 wherein determining a wait period based on the adjusted cluster coefficient comprises determining a counter value based on the adjusted cluster coefficient.

3. The method of claim 2 wherein implementing the updated bandwidth values received to determine updated node weight values of the other nodes after the wait period has expired comprises implementing the updated bandwidth values received to determine updated node weight values of the other nodes after a counter achieves one of a predetermined value from a starting point corresponding to the counter value or the counter value from a starting point corresponding to the predetermined value.

4. The method of claim 3 implementing the bandwidth values received to determine updated node weight values of the other nodes after a counter achieves one of a predetermined value from a starting point corresponding to the counter value or the counter value from a starting point corresponding to the predetermined value comprises implementing the updated bandwidth values after a counter decrements from the counter value to zero.

5. The method of claim 2 wherein determining a counter value based on the adjusted cluster coefficient comprises determining a counter value based on the adjusted cluster coefficient and an original counter value.

6. The method of claim 2, further comprising sending the counter value to at least one other node in the network.

7. The method of claim 2 wherein determining a counter value comprises determining a counter value corresponding to a countdown value.

8. The method of claim 2 wherein determining a counter value comprises determining a counter value corresponding to a count-up value.

9. The method of claim 1 wherein scheduling network communications in a network having nodes connected by links comprises scheduling network communications in a network having nodes connected by at least one wireless link.

10. The method of claim 1 wherein determining a cluster coefficient comprises determining a cluster coefficient is equal to:

$$nCr(n_1,r)/nCr(n_2,r)$$

where $n_1$ is equal to the number of one-hop neighbors, $n_2$ is equal to the number of neighbors that are N-hops and less and r is equal to 2.

11. The method of claim 10 wherein N is equal to 2.

12. The method of claim 1 wherein adjusting the cluster coefficient to form an adjusted cluster coefficient comprises using a steepness factor to determine the adjusted cluster coefficient.

13. The method of claim 12 wherein adjusting the cluster coefficient to form an adjusted cluster coefficient comprises using $$ACC = \frac{1}{sf*CC+1} - \frac{CC}{sf+1}$$

where ACC is the adjusted cluster coefficient, sf is the steepness factor and CC is the cluster coefficient.

14. The method of claim 1 wherein receiving updated bandwidth values from the other nodes comprises receiving the bandwidth values from the neighbors of the first node.

15. The method of claim 1 wherein implementing the updated bandwidth values received to determine updated node weight values of the other nodes comprises determining updated node weight values of the first node and the neighbors of the first node based on the updated bandwidth values received from the neighbors of the first node and the updated bandwidth value of the first node.

16. The method of claim 15 wherein implementing the updated bandwidth values received to determine updated node weight values of the other nodes further comprises:
determining access values for each node based on a fair access technique; and
determining network scheduling based on the access values and the updated node weight values.

17. The method of claim 16 wherein determining access values for each node based on a fair access technique comprises determining random values for each two-hop neighbor of the first node using a Node Activation Multiple Access (NAMA) technique to generate random numbers for each node based on a node ID.

18. The method of claim 1, further comprising sending an updated bandwidth value of a first node for each link connected to the first node to neighbors of the first node.

19. The method of claim 18 wherein sending an updated bandwidth value of a first node for each link connected to the first node to neighbors of the first node comprises sending a updated bandwidth value corresponding to a number of outbound packets in a queue of the first node for a link.

20. The method of claim 19 wherein sending an updated bandwidth value of a first node for each link connected to the first node to neighbors of the first node comprises sending a bandwidth value of a first node during a control timeslot.

21. A network node to schedule communications in a network having nodes connected by links comprising at least one wireless link, the network node comprising:
 circuitry to:
  receive at the network node updated bandwidth values of other nodes in the network;
  determine a cluster coefficient based on a number of one-hop neighbors and a number of two-hop neighbors of the node;
  adjust the cluster coefficient to form an adjusted cluster coefficient;
  determine a counter value based on the adjusted cluster coefficient; and
  implement the updated bandwidth values received to determine updated node weight values of the other nodes after a counter achieves one of a predetermined value from a starting point corresponding to the counter value or the counter value from a starting point corresponding to the predetermined value.

22. The network node of claim 21 wherein the circuitry comprises at least one of a processor, a memory, programmable logic and logic gates.

23. The network node of claim 21 wherein the circuitry to determine a counter value based on the adjusted cluster coefficient comprises circuitry to determine a counter value based on the adjusted cluster coefficient and an original counter value.

24. The network node of claim 21 the circuitry to implementing the bandwidth values received to determine updated node weight values of the other nodes after a counter achieves one of a predetermined value from a starting point corresponding to the counter value or the counter value from a starting point corresponding to the predetermined value comprises circuitry to implement the updated bandwidth values after a counter decrements from the counter value to zero.

25. The network node of claim 21 wherein the cluster coefficient is equal to:

$$nCr(n_1,r)/nCr(n_2,r)$$

where $n_1$ is equal to the number of one-hop neighbors, $n_2$ is equal to the number of one-hop and two-hop neighbors and r is equal to 2.

26. The network node of claim 21 wherein the circuitry to adjust the cluster coefficient to form an adjusted cluster coefficient comprises circuitry to use a steepness factor to determine the adjusted cluster coefficient using a formula:

$$ACC = \frac{1}{sf*CC+1} - \frac{CC}{sf+1}$$

where ACC is the adjusted cluster coefficient, sf is the steepness factor and CC is the cluster coefficient.

27. The network node of claim 21 wherein the circuitry to implement the updated bandwidth values received to determine updated node weight values of the other nodes further comprises circuitry to:
 determine access values for each node based on a fair access technique; and
 determine network scheduling based on the access values and the updated node weight values.

28. The network node of claim 27 wherein the circuitry to determine access values for each node based on a fair access technique comprises circuitry to determine random values for each two-hop neighbor of the first node using a Node Activation Multiple Access (NAMA) technique to generate random numbers for each node based on a node ID.

29. An article, comprising:
 a non-transitory computer readable medium that stores executable instructions to schedule communications in a network having nodes connected by links comprising at least one wireless link, the instructions causing a processor to:
  receive updated bandwidth values of other nodes;
  determine a cluster coefficient based on a number of one-hop neighbors and a number of two-hop neighbors;
  adjust the cluster coefficient to form an adjusted cluster coefficient;
  determine a counter value based on the adjusted cluster coefficient; and
  implement the updated bandwidth values received to determine updated node weight values of the other nodes after a counter achieves one of a predetermined value from a starting point corresponding to the counter value or the counter value from a starting point corresponding to the predetermined value.

30. The article of claim 29 wherein instructions causing a processor to determine a counter value based on the adjusted cluster coefficient comprises instructions causing a machine to determine a counter value based on the adjusted cluster coefficient and an original counter value.

31. The article of claim 29 wherein instructions causing a processor to implement the bandwidth values received to determine updated node weight values of the other nodes after a counter achieves one of a predetermined value from a starting point corresponding to the counter value or the counter value from a starting point corresponding to the predetermined value comprises instructions causing a machine to implement the updated bandwidth values after a counter decrements from the counter value to zero.

32. The article of claim 29 wherein the cluster coefficient is equal to:

$$nCr(n_1,r)/nCr(n_2,r)$$

where $n_1$ is equal to the number of one-hop neighbors, $n_2$ is equal to the number of one-hop and two-hop neighbors and r is equal to 2.

33. The article of claim 29 wherein the instructions causing a processor to adjust the cluster coefficient to form an adjusted cluster coefficient comprises instructions causing a machine to use a steepness factor to determine the adjusted cluster coefficient using a formula:

$$ACC = \frac{1}{sf*CC+1} - \frac{CC}{sf+1}$$

where ACC is the adjusted cluster coefficient, sf is the steepness factor and CC is the cluster coefficient.

* * * * *